Nov. 4, 1941.  R. F. PEO  2,261,409
HYDRAULIC SHOCK ABSORBER
Filed July 14, 1939
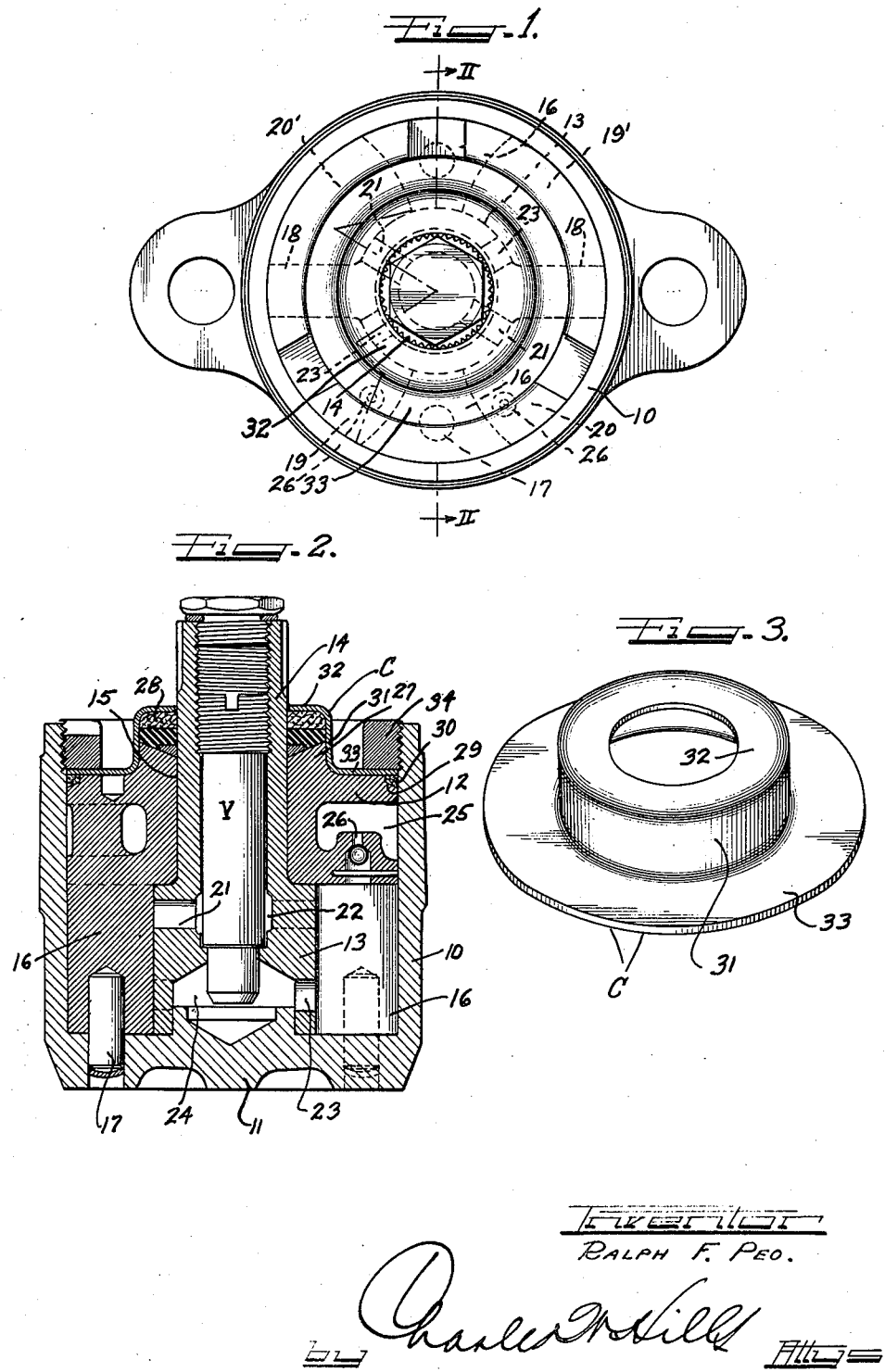
Inventor
RALPH F. PEO.

Patented Nov. 4, 1941

2,261,409

UNITED STATES PATENT OFFICE 2,261,409

HYDRAULIC SHOCK ABSORBER

Ralph F. Peo, Buffalo, N. Y., assignor to Houde Engineering Corporation, Buffalo, N. Y., a corporation of New York Application July 14, 1939, Serial No. 284,415

6 Claims. (Cl. 188—89)

My invention relates to hydraulic shock absorbers and particularly to improved and simplified means for packing and sealing the structure against leakage of the hydraulic fluid.

My invention is of particular advantage and utility in shock absorbers of the so-called rotary or Houdaille type in which a cylindrical housing or casing provides working chambers for an oscillatory piston structure whose shaft extends outwardly through and is journaled in an end wall which is hollow to provide reservoir space for replenishing fluid for the working chambers. With such structures it is important to prevent leakage of the hydraulic fluid outwardly between the shaft and its bearing wall, and leakage outwardly from the reservoir space where the outer closure wall for said space is the cylindrical wall of the housing.

An important object of the invention is to provide improved packing and sealing arrangement and structure comprising a single cover or retainer for adequate packing and sealing material around the shaft and between the reservoir providing frame and the housing wall.

A further object is to provide such arrangement that the packing retainer or cover may be readily removed for repacking purposes.

A further important object is to provide arrangement in which an annular nut serves the double purpose of holding the shaft bearing and working chamber forming parts in the housing and clamping the packing retainer or cover in service position and so that, upon removal of the clamping nut the packing retainer may be withdrawn for repacking purposes.

The various features of my invention are incorporated in the structure shown on the drawing, on which Figure 1 is an end view of a shock absorber;

Figure 2 is a section on plane II—II of Figure 1; and

Figure 3 is an enlarged perspective view of the packing retainer or cover.

The shock absorber shown comprises the cylindrical housing or casing 10 having the base 11. Fitting into the open end of the housing 10 is the wall or inner casing 12 which, with the cylindrical housing wall 10 and the base 11, defines a cylinder space in which is the hub 13 of a piston structure whose shaft 14 extends through the bearing opening 15 through the inner casing 12.

Extending into the cylinder space from diametrically opposite sides of the inner casing 12 are the abutments 16 which receive pins 17 extending upwardly from the base 11 for securing the abutments and the casing 12 against rotation or displacement. The piston structure hub 13 has diametrically opposite radially extending vanes 18 which operate between the abutments during oscillation of the piston structure in the housing, the abutments together with the vanes and the piston structure hub defining the hydraulic working chambers 19, 19' and 20, 20'. Passageways 21 connect the working chambers 19 and 19' with a valve chamber 22 in the piston structure, and passageways 23 connect the working chambers 20 and 20' with the space 24 in the lower end of the piston structure, a suitable valve structure V being interposed between the chambers 22 and 24 for regulating the resistance to the flow of the hydraulic fluid between the working chambers when the piston structure is oscillated.

The inner casing 12 is cored out to provide a reservoir 25 for replenishing the working chambers through check valve controlled passages 26, the cylindrical walls of the housing 10 forming the annular or surrounding wall for the reservoir space.

On the outer side of the casing 12 is the annular projection 27 forming a stuffing box around the shaft 14 for supporting resilient packing 28 of relatively large mass around the shaft to provide a seal for preventing leakage of hydraulic fluid to the exterior of the shock absorber along the shaft bearing.

At its upper outer corner, the casing 12 is cut away to provide the annular groove 29 for receiving a gasket ring 30 of suitable resilient material for engaging against the cylindrical wall of the housing 10 to form a seal for preventing leakage to the exterior of the shock absorber from the reservoir 25. The packing and gasket are held in place by a retainer or cover C preferably formed of sheet metal and comprising a substantially cylindrical body part 31, an upper horizontally extending flange 32 and a lower horizontally extending flange 33. The cylindrical body of the cover surrounds and engages with the outside of the stuffing box 27 and the flange 32 extends across the top of the packing 28 and surrounds the shaft 14. The lower flange 33 of the cover engages against the outer side of the casing 12 and extends to the cylindrical wall of the housing 10 to overlie the gasket 30. The outer end of the housing wall 10 has threading for receiving the threaded annular clamping ring or nut 34, this clamping ring or nut abutting against the inner flange 33 of the packing cover and serves two purposes. The first purpose is to securely clamp and hold the casing 12 in the housing 10 and the second purpose is to clamp the packing cover in place with pressure engagement against the packing and the gasket which are sufficiently resilient so that the pressure thereagainst by the cover C will hold them intimately against the surfaces along which leakage is to be prevented. The bottom of the stuffing box and the bottom of the groove 29 slant downwardly so that when the packing and gasket are under compression by the cover C they will be forced against the shaft and the housing respectively, the packing around the shaft and the concentric gasket engaging the housing together with the retainer or cover C forming a double seal for the shock absorber. Should the packing or gasket become worn and yeaky, the cover C can readily be removed by unscrewing the nut 34.

I thus provide simple and efficient packing means for hydraulic shock absorbers which will enable the shock absorbers to be quickly and readily repacked without removing the shock absorber from its service support or without removing or disturbing any of the functioning parts of the shock absorber.

I have disclosed an efficient embodiment of my invention but I do not desire to be limited to the exact construction and arrangement shown and described as changes and modifications may be made without departing from the scope of the invention.

I claim as follows:

1. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston, a gasket concentric with the resilient packing for sealing the outer periphery of the reservoir casing at its juncture with the shock absorber casing, a readily removable cover overlying the central packing and concentric gasket, a wall on the cover encircling the outer diameter of the stuffing box and means for pressing the said cover against the said packing and gasket to form a removably maintained double seal for the shock absorber.

2. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston, a gasket concentric with the resilient packing for sealing the outer periphery of the reservoir casing at its juncture with the shock absorber casing, a readily removable cover overlying the central packing and concentric gasket, the said cover comprising a central portion for contacting the central packing, an annular wall encircling the outer diameter of the stuffing box, a peripheral flange for engagement with the concentric gasket, and means in engagement with the said flange for pressing the cover against the said packing and gasket to form a removably maintained double seal for the shock absorber.

3. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston and extending above the stuffing box, a gasket concentric with the resilient packing for sealing the outer periphery of the reservoir casing at its juncture with the shock absorber casing, a readily removable cover overlying the central packing and concentric gasket, the said cover comprising a central portion for contacting the central packing, an annular wall encircling the outer diameter of the stuffing box, a peripheral flange for engagement with the concentric gasket, and an exteriorly threaded nut screw threadedly maintained in the shock absorber casing for engagement with the said flange to press the cover against the packing and gasket and to removably maintain same in place.

4. For use in a shock absorber of the oscillatory piston type having a reservoir chamber through which the piston passes, the said chamber having a stuffing box surrounding the upper portion of the piston, sealing means for the said piston and chamber, said means comprising a resilient central packing of relatively large mass within the stuffing box occupying its entire area and extending thereabove, a ring gasket at the outer periphery of the reservoir chamber concentric with the resilient packing, a readily removable cover encircling the outer diameter of the stuffing box for engagement with both the ring gasket and central packing, and a nut for pressing the cover against the said gasket and packing to form a double seal for the shock absorber.

5. For use in a shock absorber of the oscillatory piston type comprising a housing, a reservoir chamber defining casing inserted in said housing and through which the piston shaft passes, the said reservoir casing having a stuffing box surrounding the piston shaft, sealing means for the piston structure and reservoir chamber, said means comprising a resilient central packing within the stuffing box and extending thereabove, an annular groove at the outer corner of said casing, a ring gasket in said groove engaging the housing wall, a readily removable cover encircling the outer diameter of the stuffing box and having an outer flange engaging with the outer end of said packing and an inner flange seating directly against the outer side of said reservoir casing and overlying said gasket ring, and a nut threaded into the end of said housing to abut against the inner flange of said cover for holding said cover in pressure engagement with said packing and gasket ring to form a double seal for the shock absorber.

6. A hydraulic shock absorber comprising a cylindrical housing, a casing inserted into said housing to define therewith a hydraulic working space, a piston operable in said working space, a shaft for said piston extending through said casing, a stuffing box on said casing surrounding said shaft, the outer corner of said casing being cut away to provide an annular groove, packing material supported by said stuffing box, said casing being hollow to provide a reservoir chamber of which said housing forms the cylindrical closure wall, packing material in said annular groove, a sheet metal cover surrounding said stuffing box and overlying said packings, and a nut engaging with the outer end of said housing for clamping engagement with said cover whereby to effect compression of said packings by said cover for sealing against escape of hydraulic fluid along said shaft or from said reservoir chamber.

RALPH F. PEO.